Oct. 3, 1961 J. A. GREEFKES 3,003,120
TRANSISTOR OSCILLATOR
Filed Dec. 10, 1958
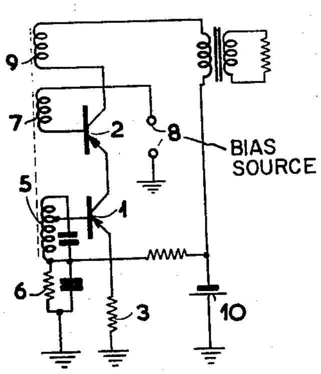
INVENTOR
JOHANNES ANTON GREEFKES
BY Frank R. Jifari
AGENT 3,003,120

TRANSISTOR OSCILLATOR

Johannes Anton Greefkes, Eindhoven, Netherlands, assignor to North American Philips Company, Inc., New York, N.Y., a corporation of Delaware Filed Dec. 10, 1958, Ser. No. 779,366
Claims priority, application Netherlands Jan. 8, 1958
3 Claims. (Cl. 331—109)

The present invention relates to transistor circuit arrangements with current distribution and utilizes this current distribution in particular for realizing a stabilized transistor oscillator. It has the feature that the current from a first transistor, which is connected as a supply source, is supplied to the emitter of a second transistor; at the base and collector of the second transistor there occur such voltages that at one polarity between the difference of these two voltages said current substantially passes through said collector and at the other polarity, substantially through said base.

In order that the invention may be readily carried into effect, an example will now be described in detail with reference to the accompanying drawing.

This drawing shows two transistors 1 and 2, the emitter-collector paths of which are connected in series-combination to a supply source 10. The current of the transistor 1 is stabilized in known manner by means of an emitter-resistor 3 in combination with a substantially constant base-bias produced across a filter 6. Thus, the transistor 1 acts as a source of current having a high internal resistance.

This current is supplied to the emitter of the transistor 2, at which such collector- and base-voltages are active, in accordance with the invention, as to distribute the current to the collector and to the base respectively. For this purpose, the bias on the base of the transistor 2 and produced across terminals 8 considerably exceeds that on the base of the transistor 1, while the collector voltage of the transistor 2 may vary in such manner that, when exceeding (that is being more negative than) the base-bias of the transistor 2, the current flows to this collector, while in the case of being lower (less negative) than the base-bias of the transistor 2, the current flows to the base of the transistor 2.

The invention will in particular be described with reference to an oscillator circuit arrangement.

For this purpose, the base-circuit of the transistor 1 comprises a tuned circuit 5, while the coupling windings 7 and 9 are connected in the base-circuit and collector-circuit respectively of the transistor 2. The winding 7 causes negative feedback and the winding 9 causes positive feedback on the circuit 5. So long as the collector potential of the transistor 2 exceeds the bias on the base of the transistor 2, the current will flow to the collector winding 9. This produces a strong positive feedback between the winding 9 and the circuit 5 so that the circuit tends to self-oscillate.

When, however, the collector voltage of the transistor 2 drops below the base-voltage, the current of the transistor 1 will tend to flow not to the collector but to the base of the transistor 2 and will consequently produce negative feedback through the winding 7. Thus, a sharp limitation of the oscillator amplitude occurs substantially independently of the transistor properties and this consequently results in a very slight wave distortion. Moreover, the circuit arrangement is very stable; this is true first because of the presence of the emitter-resistor 3, and second because the transistor 1 is always operated in the conductive part of its characteristic (A-setting), as a result of which its coupling to the circuit 5 is allowed to remain weak. The transistor 1 therefore fulfills the function of a current stabilizer, hence indirectly of a frequency stabilizer, whereas the transistor 2 fulfills the function of an oscillation limiter.

Varying the value of the supply 10 permits a modulated oscillator voltage to be obtained. This however achieved with the same effect and lesser energy by making the voltage at the terminals 8 act in the rhythm of a modulating voltage.

In a practical example, the following elements and values were used: Transistors of type OC 72. Voltage of the source 10=12 v. Voltages derived from the latter through filter 6=2 v. and at the terminals 8=6 v. Resistor 3=180Ω. Power=23 mw. Distortion less than 1%. The winding 5 had 224 turns with a tapping at 19 turns, the winding 7 had 12 turns, and the winding 9 had 2 turns on a common pot core. Frequency 10 to 20 k.c/s. These values are given for illustrative purposes only and are not meant to limit the scope of the invention, which scope is set forth in the appended claims.

What is claimed is:

1. A transistor circuit arrangement with current distribution, comprising first and second transistors each having base, emitter and collector electrodes, the emitter-collector paths of both transistors being connected in series with a source of power supply, the collector of the first transistor being connected to the emitter of the second transistor, means coupled between the base of the first transistor and a point of reference potential for producing a substantially constant bias therefor, means coupled between the base of the second transistor and the point of reference potential for producing a bias therefor, the base bias for the second transistor substantially exceeding that for the first transistor, a load for the second transistor connected between the collector electrode and said source of power supply, the base bias of the second transistor and the source of supply having such polarities that the current flowing in the emitter of the second transistor flows substantially through the collector when the voltage at the collector exceeds in magnitude the voltage at the base, and said current flows substantially through the base when the voltage at the base exceeds in magnitude the voltage at the collector, means providing a positive feedback between the collector circuit of the second transistor and the base-emitter path of the first transistor, and means providing a negative feedback between the base circuit of the second transistor and the base-emitter path of the first transistor.

2. A transistor circuit arrangement with current distribution, comprising first and second transistors each having base, emitter and collector electrodes, the emitter-collector paths of both transistors being connected in series with a source of power supply, the collector of the first transistor being connected to the emitter of the second transistor, first bias means coupled between the base of the first transistor and a point of reference potential for producing a substantially constant bias therefor, second bias means coupled between the base of the second transistor and the point of reference potential for producing a bias therefor, the base bias for the second transistor substantially exceeding that for the first transistor, a parallel tuned circuit comprising a first coil and a capacitor coupled in the base circuit of said first transistor to said first bias means, a load for the second transistor connected between the collector electrode and said source of power supply, the base bias for the second transistor and the source of supply having such polarities that the current flowing in the emitter of the second transistor flows substantially through the collector when the voltage at the collector exceeds in magnitude the voltage at the base, and said current flows substantially through the base when the voltage at the base exceeds in magnitude the voltage at the collector, a first feedback coil connected to the load in the collector circuit of the second transistor inductively coupled with said first coil to provide positive feedback thereto, and a second feedback coil connected to the second bias means in the base circuit of said second transistor inductively coupled with said first coil to provide negative feedback thereto.

3. A circuit arrangement as set forth in claim 2, in which a stabilizing resistor is included in the emitter circuit of the first transistor, whereby the first transistor acts as a current stabilizer and the second transistor acts as an oscillator limiter.

References Cited in the file of this patent

UNITED STATES PATENTS 2,791,739 Light -------------------- May 7, 1957